(12) United States Patent
Summach et al.

(10) Patent No.: US 6,952,998 B1
(45) Date of Patent: Oct. 11, 2005

(54) MINIMUM TILL SEEDING KNIFE

(75) Inventors: Terry Emerson Summach, Saskatoon (CA); Bradley T Summach, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 09/623,847

(22) PCT Filed: Feb. 5, 1999

(86) PCT No.: PCT/CA99/00073

§ 371 (c)(1),
(2), (4) Date: Jul. 31, 2000

(87) PCT Pub. No.: WO99/39562

PCT Pub. Date: Aug. 12, 1999

(30) Foreign Application Priority Data

Feb. 5, 1998 (GB) .................................. 9802413

(51) Int. Cl.[7] .......................... A01C 5/06; A01C 7/00; A01C 15/02; A01C 23/02
(52) U.S. Cl. ...................... 111/118; 111/119; 111/123; 111/156; 111/174
(58) Field of Search ................ 111/118–129, 149–156, 111/170, 174, 186–188

(56) References Cited

U.S. PATENT DOCUMENTS 2,703,044 A * 3/1955 Adair ..................... 111/101
5,163,780 A * 11/1992 Fincham ................... 405/36
5,605,196 A * 2/1997 Grimm et al. ............. 172/266

FOREIGN PATENT DOCUMENTS

| CA | 2105050 | * | 11/1994 |
| CA | 2099555 | * | 1/1995 |
| GB | 1574412 | * | 9/1980 |

* cited by examiner

Primary Examiner—Christopher J. Novosad
(74) Attorney, Agent, or Firm—Rebecca Henkel; Brant T. Maurer

(57) ABSTRACT

The present invention relates to a knife for and a method of zero till or minimum till seeding and fertilizing. The knife is particularly adpated for dray land conditions producing minimum soil disturbance and very shallow operation. The knife has a high penetration angle preferably of 45 degrees which permits the blade to enter high trash surface cover with little tendency to plug due to trash accumulation. The blade has a forward angle of attack, the lower cutting edge advancing before the upper cutting edge, serving to make a clean cut in the soil surface without accumulating trash. Seed and/or fertilizer conduits are attached to or incorporated in the trailing face of the blade on which the outlets may be spaced for controlled placement of the materials. By the method a furrow is cut having a substantial transverse component in an operation with a substantial forward components. A preferred embodiment includes a horizontal extension blade for cutting a horizontal swath at a shallow depth trough weed growth. Conduits may be secured to the extension to allow greater separation and control of material placement. The knives may be arranged in overlapping configuration on the draw bar to effect weed cutting, seeding and fertilizing of a complete width of soil in a single pass.

54 Claims, 10 Drawing Sheets double shoot extension

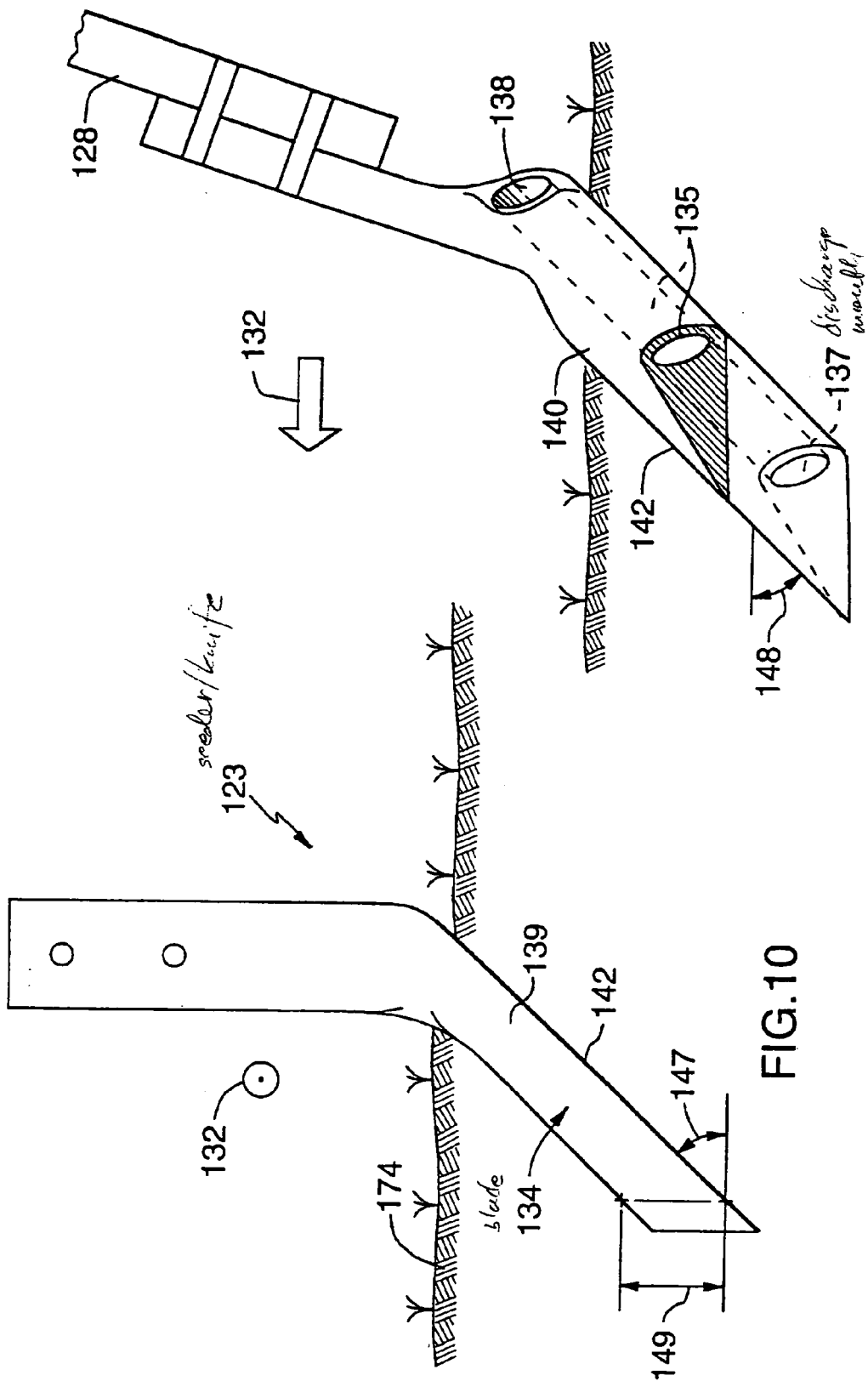

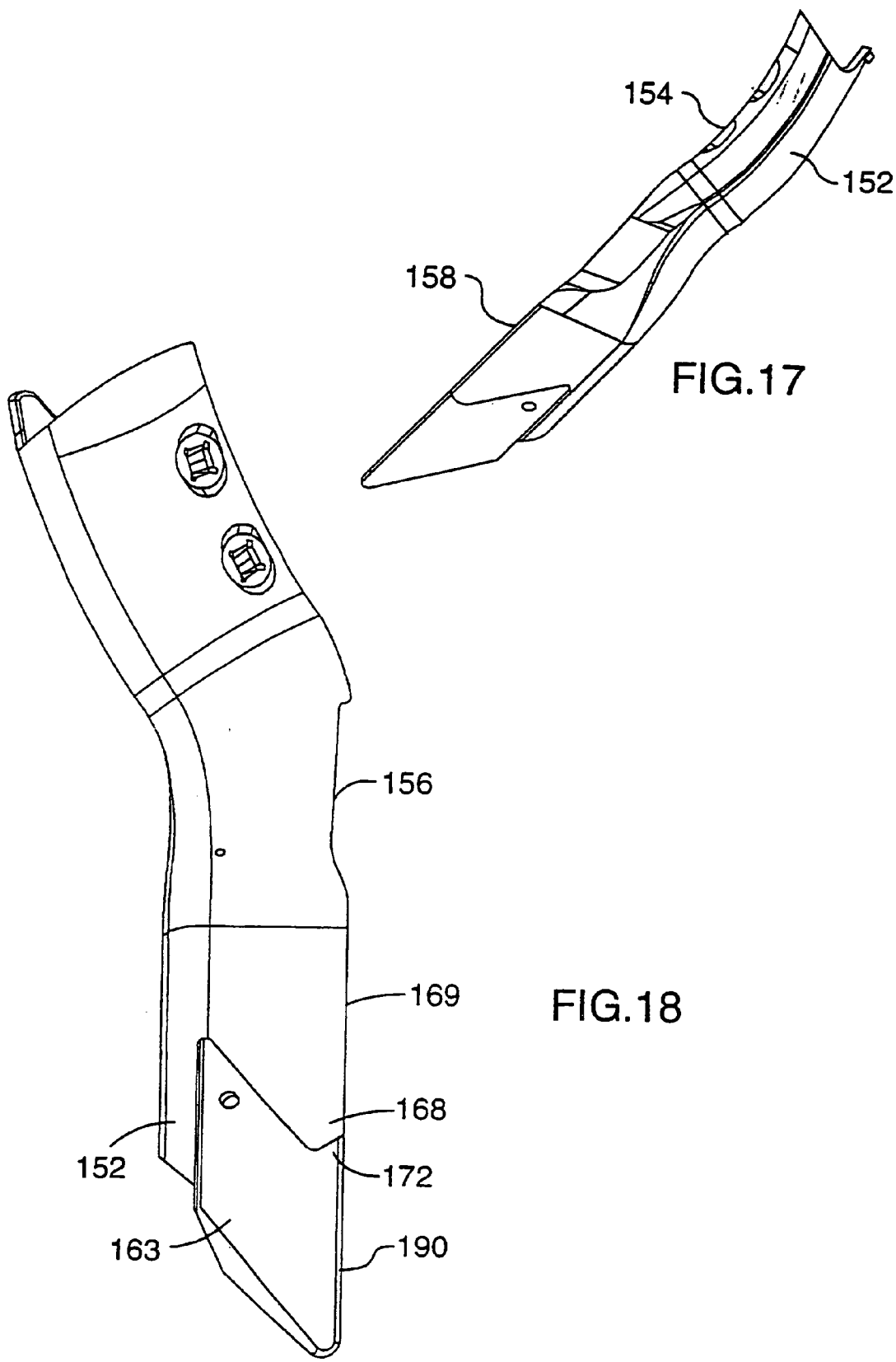

MINIMUM TILL SEEDING KNIFE

FIELD OF THE INVENTION

The present invention relates to a method of farming, a farm implement and a knife or knife assembly which may be used as part of no-till or minimum-till farming practices primarily for placement in the ground of seed and/or fertilizer and other materials. The invention works in all field conditions, and in particular it operates with minimum soil disturbance in minimum till and zero till farming practices, better allows passage of trash in such practices, and does not cause the hair-pinning of crop residue as is often caused by disc-type openers. As a result, the method provides a simple, reliable and inexpensive proceedure and tool which can be used in all farming practices so that multiple types of equipment are not required by farms for various soil conditions.

BACKGROUND OF THE INVENTION

Important advantages have been found in soil preparation, and seed and fertilizer delivery in employing no-tilling or minimum tilling methods which cause minimum disturbance lo the soil. This is particularly important in dry land conditions where the soil is subject to moisture and topsoil loss if conventional tilling methods are used.

It is usually desirable when employing no-till farming practices to disturb the soil surface as little as possible. The surface will be covered with the residue from previous crops, and the surface layer will contain old root structure. This plant material can serve to retain moisture below the surface and to assist in securing the soil against runoff and erosion. Particularly in dry land conditions it is beneficial to retain this covering. Tools currently available to seed into zero till or minimum till conditions have encountered problems.

Fertilizing prior to seeding is a method utilized by some farmers. While broadcasting the fertilizer on the surface is a method that does not disturb the surface, it is very inefficient, as much of the fertilizer can be lost due to run off of surface water. Placement of fertilizer at a level well below the level that seed will be place has been utilized. Tilling and fertilizing is disclosed in Great Britain patent No. 1,574,412 issued to Ede in 1980. In that prior art device an angled tilling blade for deeply penetrating the soil is shown with a central duct and a number of separated orifices for providing fertilizer in vertically separated bands. To maintain those desirable characteristics of the surface structure in zero till conditions major surface disturbance is not acceptable.

Zero till seeding devices have been developed to deposit high concentration bands of fertilizer in furrows. If the seed is placed in close prozimity to a high concentration of fertilizer, burning of the newly germinated plant will result. To avoid this one technique has been to separate the seeds by a soil layer from the fertilizer.

In U.S. Pat. No. 5,396,851 issued to Beaujot in 1995 fertilizer is deposited by a first vertical blade which cuts a deeper furrow. A second blade cuts a second furrow in which to deposit seed. Other devices such as disclosed in U.S. Pat. No. 4,798,151 issued to Rodrigues in 1989 form a deep fertilizer furrow, and a shallower shelf above the fertilizer on which to plant the seed. In both cases, to minimize soil disturbance only a narrow furrow is cut.

It is known to prepare soil when using traditional tilling methods to cut out weed growth prior to or at the time of a seeding operation.

U.S. Pat. No. 1,085,825 issued in 1914 to Rubarth discloses a subsurface tilling blade for use with a traditional turning plowshare. The tilling blade its curved to angle the cut and includes a horizontal blade on the opposite side. The blades are shown to include an arrangement in overlapping fashion to cut the full width of the subsurface to remove weeds and old growth. Seeding and fertilizing are separate operations.

U.S. Pat. No. 5,005,497 issued in 1991 to Kolskog discloses a deep banding knife for delivering seed and fertilizer with an additional transverse rod for disrupting weed growth. The banding knife makes a substantially vertical cut in the soil. The rod disrupts the subsoil to loosen soil and cut weeds. The transverse rods can be arranged in parallel to remove weeds completely.

Adaptations of these concepts have been used for deep placement of fertilizer in fully tilled row-crop situations.

In traditional zero till farming practice, no till furrows are separated by undisturbed areas of soil and weeds. Typically a herbicide application is necessary to control weeds which would otherwise compete with the crop growth and possibly contaminate the harvest. Herbicide is an expensive additional operation.

A further problem encountered by seeding implements particularly in zero till conditions is the accumulation of trash during seeding which impairs their operation. Many devices for seeding in zero till conditions provide a blade which penetrates the soil substantially vertically. Trash gathers around the blade and is dragged with the device. This can impair operation. It also removes the desired moisture retaining cover. In an effort to combat this problem the Beaujot patent discussed above is adapted to lift over obstacles, such as crop stubble, interrupting seeding. Such a technique reduces trash accumulation, but reduces seeding efficiency.

A deep sowing tool has been disclosed for rice seeding in relatively wet conditions in USSR patent No. 372,962 issued in 1973 using a tilling blade and deep seed delivery to cover seeds and to reduce the need to water. This is not suitable for zero tilling, as tilling using this tool is deep in order to cause deep soil aeration. The blade of this prior art design penetrates the soil essentially vertically, with an angled blade portion cutting more deeply. The blade portion of this design would also be subject to accumulation of trash.

Significant soil disruption occurs as vertical furrow parting tools are drawn through surface soils at relatively high velocity, especially in high trash conditions or with unprepared soils. Additional energy is imparted to the soil, throwing and turning the soil.

It is desired for minimum soil disruption to pass through the soil surface and any trash cleanly without undue lifting or turning of the soil. While disk openers have the ability to cut through most trash, some straw will not cut easily, and is pushed into the furrow, a result commonly called hairpinning. This can displace seeds, as well as drying out the seed bed. As well, effective no-till disc opener designs are relatively expensive.

The prior art fails to provide teaching to or a suggestion of any method or device for operation in zero or min-till conditions which provides tilling and/or seeding, fertilizing or weed clearing in a single pass without significantly disrupting the soil or the order of the soil structure and avoid hairpinning. It is desired to provide the advantages of tilling seeding and weed clearing without trash accumulation.

SUMMARY OF THE INVENTION

The invention provides a ground opening knife for use in no-till or minimum-till farming operations primary in conjunction with seed and/or fertilizer placement adjacent a soil cut-line generally in the direction of travel comprising connection means adapted to mount the knife on a farm implement, and a blade comprising a lower portion, said lower portion adapted to open the soil along the direction of travel, said lower portion adapted to extend into the soil but no more than 6 inches measured vertically, said lower portion adapted to be oriented in a direction having a $1^{st}$ component of between 30 and 60 degrees below horizontal in a plane transverse to the said direction of travel, and a $2^{nd}$ component forward in the direction of travel.

The knife may include an upper portion adjacent said lower portion adapted to extend away from the surface of the soil and is adapted to pass through materials or residue on the surface of the soil or associated with the passage of the knife through the soil.

The knife way also include an extension extending substantially laterally from said lower portion and provides support for material delivery tubes at various locations along the blade and extension.

The knife may also include in extension to form a secondary furrow adjacent the said lower portion intermediate the surface of the soil and the lowermost end of the said blade and may include an extension of said leading edge generally forward in the direction of travel.

The invention also provides a method of no-till or minimum-till farming operation primarily in conjunction with seed and/or fertilizer placement adjacent a soil cut-line aligned generally in the direction of travel comprising forming a furrow in the soil extending from said soil cut-line no more than 6" into the soil mesured vertically, and forming the said furrow by cutting the soil along a direction having a $1^{st}$ component of between 30 and 60 degrees below horizontal in a plane transverse to the said direction of travel, and a $2^{nd}$ component forward in the direction of travel.

The method substantially minimizes any disturbance of the cut soil either above the said furrow or below it or both whether distribution of particulate or other materials is included at the same time within the furrow being formed.

The invention also provides a no-till or minimum-till farm implement primarily tor use in conjunction with cultivation or materials placement adjacent a plurality of soil cut-lines generally parallel and in the direction of travel comprising a support frame stucture, a plurality of around opening knives attached to said support structure, spaced from each other in a direction transverse to the direction of travel of the implement and each adapted to cut the soil along adjacent ones of said cut-lines, each said knife having a blade comprising a lower portion, said lower portion adapted to open the soil along the direction of travel, said lower portion adapted to extend into the soil but no more than 6 inches measured vertically between the surface of the soil and the lowermost extremity oft said blade, said lower portion adapted to be oriented in a direction having a $1^{st}$ component of between 30 and 60 degrees below horizontal in a plane transverse to the said direction of travel, and a $2^{nd}$ substantial component forward in the direction of travel.

The farm implement may include an extension of the blade extending laterally across a substantial portion of said spacing between adjacent said cut-lines when viewed in plan view.

The invention will be more clearly understood to those skilled in the art with the following detailed description of preferred embodiments with reference to the following draftings in which:

BRIEF DESCRIPTION OF THE FIGURES

FIGS. 8-1 through 8-3 are front, top and side elevations respectively of another embodiment of the invention adapted for double shooting of materials in seeding.

FIG. 10 is a horizontal front elevation of an angled seeding knife, in use;

FIG. 11 is a side elevation of the knife of FIG. 10, from the left side in FIG. 10, and FIG. 11 includes a cross-section on the line X—X of FIG. 10;

FIGS. 16, 17, 18 are further elevations of the knife of FIG. 15;

FIG. 9 is a plan-view diagram of an implement 120 which carries thirty-five angled-knife seeders 123 in four rows. The implement 120 has a centre section 124, and two hinged wings 125. The wings 125 can be folded upwards for road-transport and storage of the implement. The centre section 124 includes a hitching means 126 whereby the implement can be towed by a tractor.

It will be noted that some of the angled-knife seeders 123 slope to the left, and some to the right. Thus, there is no, or only a small, net sideways force on the implement. The left seeders and the right seeders are kept separate, in banks, since the configuration of the seeders is not suitable for close-pitched left-right mountings thereof.

Press-wheels 127 are provided, one in-line behind each seeder, to roll over, and to close the ground, after the seeds have been deposited by the seeders.

Like references are used throughout to designate like elements.

DETAILED DESCRIPTION OF THE PREFERRED EMBODIMENTS

Figure 1:
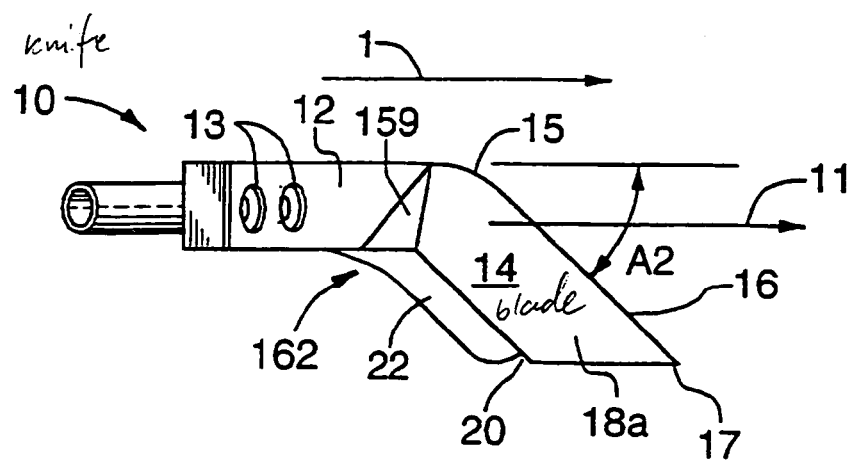
FIG. 1 is a plan view of a single knife according to the present invention.
Figure 2:
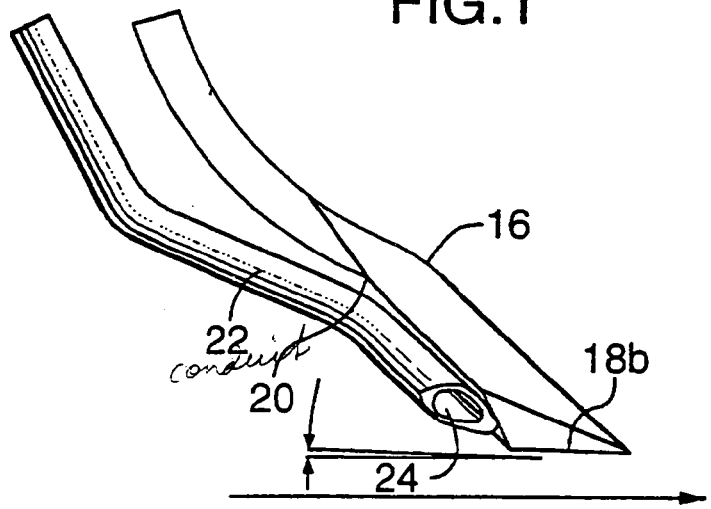
FIG. 2 is a side view of the embodiment of FIG. 1.
Figure 3:
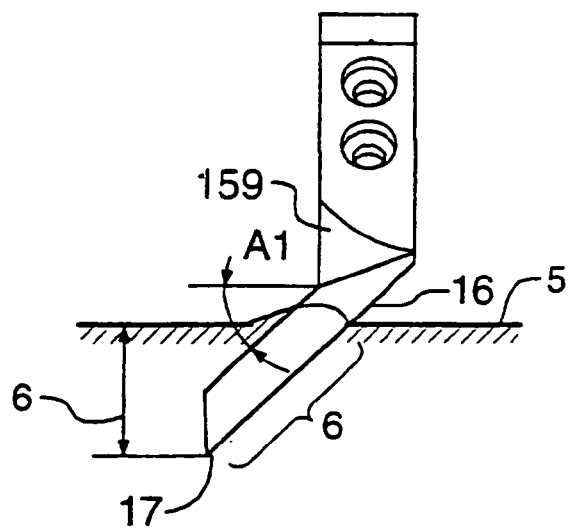
FIG. 3 is a front view of the embodiment of FIG. 1.

The preferred embodiment of the single knife of the present invention is as shown generally at 10 in FIGS. 1–3. In FIG. 1 arrow designated 1 shows the direction of travel of the knife through the soil when working.

Figure 7:
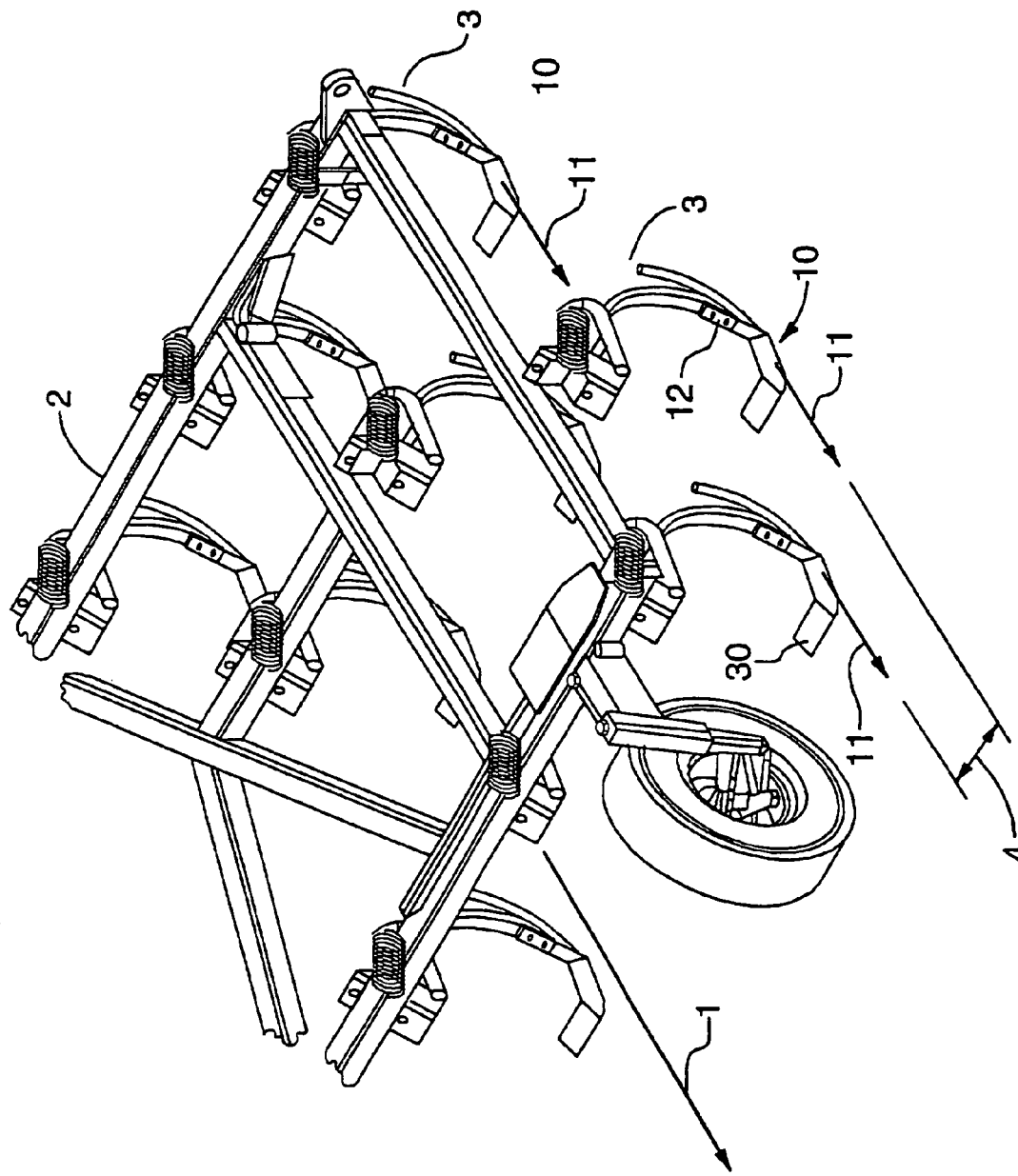
FIG. 7 is an isometric view of the embodiment of FIG. 4 arranged on an implement for operation.

As shown in FIG. 7 the knife 10 is typically attached to a cultivator-type frame or implement generally indicated at 2 in FIG. 7 to be towed by a tractor in a direction of travel 1 primarily in cooperation with a tow-between or tow-behind seed supply carrier (not shown) having a repository of seed, fertilizer or other material and fluid passages for connection with the knife 10. The frame 1 is shown in general online only.

The knife 10 includes a shank 12 which serves as a connection for mounting the knife 10 selectively on the implement in a known fashion (as at 3 in FIG. 7). As shown in FIG. 7 an appropriate spacing 4 for seeding or tilling operations will be selected, determining the number and spacing of knives 10 mounted across the width of the implement. The shank 12 preferably has a pair of holes 13 for mounting bolts or the mounting could be provided in any conventional manner such as a knock-on taper mounting system or other known mounting means.

Knife 10 includes a blade 14 formed to penetrate the soil along a soil cut-line 11 oriented in the direction of travel. Penetration of the soil occurs at an angle A which has both substantial lateral (A1) and forward (A2) components of approximately 35–55 degrees to the surface 5 of the soil to be tilled. Preferably each of lateral and forward components A1 and A2 respectively is 45 degrees. Soil penetration is by the lower portion of the blade as at 6 in FIG. 3 and is no more than 6 inches, consistent with minimum till or no till farming practices.

The lateral component A1 of angle A determines the final angle of the furrow cut into the soil. The angled furrow allows seed to be planted ensuring soil cover.

The blade is also angled significantly forwardly by component A2 of angle A. Preferably lower end 17 of the cutting edge 16 is significanly in advance of the upper end 15 of the cuffing edge 16. Deeper soil is cut and lifted in advance of cutting the surface soil allowing the surface to be cut along cut-line 11 more easily and without undue lateral disruption. Vertical motion is limited. The forward component of angle A of the blade cuts through the surface and trash layers last without accumulating trash on the knife 10. Leading edge 16 is preferably continuous from its lower end 17 to its upper end 15.

The blade 14 has a leading cutting edge 16 and a pair of opposing angled surfaces 18a and 18b which form a wedge shaped profile. The profile shape is determined by the furrow opening required. Edge 16 may be in 2 parts, 1 below the surface and another above but preferably extends continuously above the surface sufficient to move trash and other materials aside without accumulation. Also preferably it is formed aligned with the leading edge of the lower portion of the blade.

Preferably surface 18b is inclined slightly from the horizontal to avoid sliding contact with the soil below the blade 14 and minimize soil disturbance below the cut.

Also preferably, the rear surface of blade 14 is also angled forwardly and downwardly so as to assist in the creation of a small temporary cavity behind the blade as it travels through the soil.

The overall effect is to provide a method and knife whereby primarily vertical motion is imparted to the soil to permit the blade 14 passage and then a return substantially vertical motion is permitted whereby the soil may return to its approximate original location.

Adjacent the trailing surface 20 of the blade 14 a conduit 22 may be secured for delivering seeds or other material.

The conduit 22 may have an outlet 24 near the lower end 17 of the blade 14 as shown in FIGS. 1 and 2, and as a result the outlet 24 is adjacent the lowest area ot the furrow cut by the blade 14. The seed delivery conduit 22 is protected from damage as the blade 14 is advanced though the soil by blade body 14. The outlet 24 is also shielded from becoming clogged with earth by this arrangement.

Additional conduits along the blade for fertilizer, herbicide or other materials may be similarly located (not shown in FIGS. 1–3).

The preferred method provides the steps of forming an angled no-till or minimum till furrow by a knife which furrow cutting motion has both a substantial forward and a substantial lateral component both above and below the ground to a depth of 6 inches.

In a preferred method, seed and fertilizer are scattered from adjacent outlets in a pattern across the width of the furrow. The outlets may be spaced apart to appropriate depths and separation, for example, placing a fertilizer outlet at the lowest end ot the blade for deepest application and a seed outlet spaced above it on the angled blade 14.

Figures 1, 8:
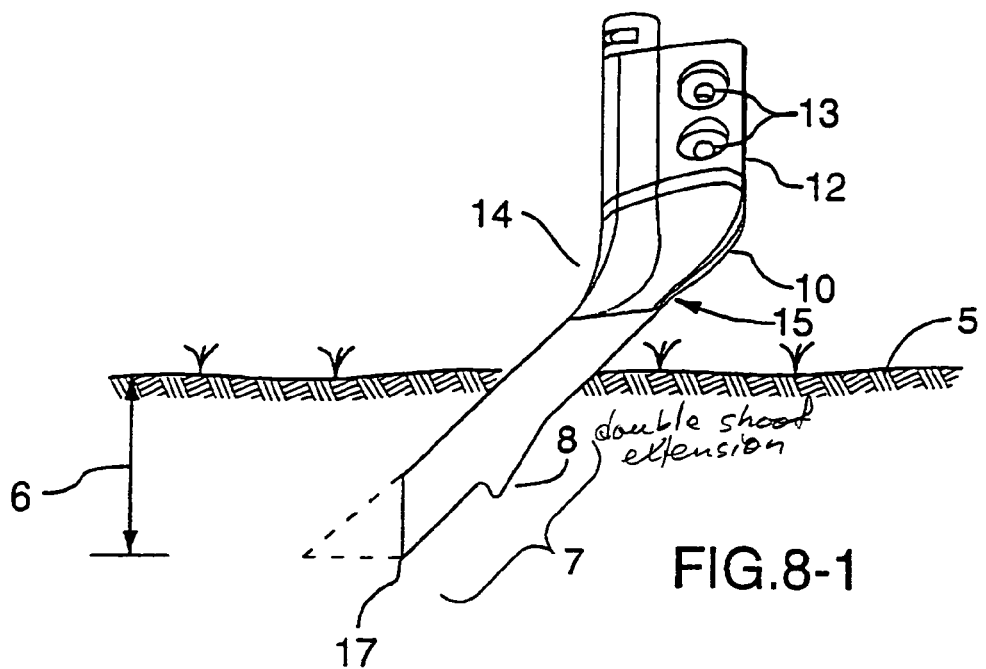
Figures 2, 8:
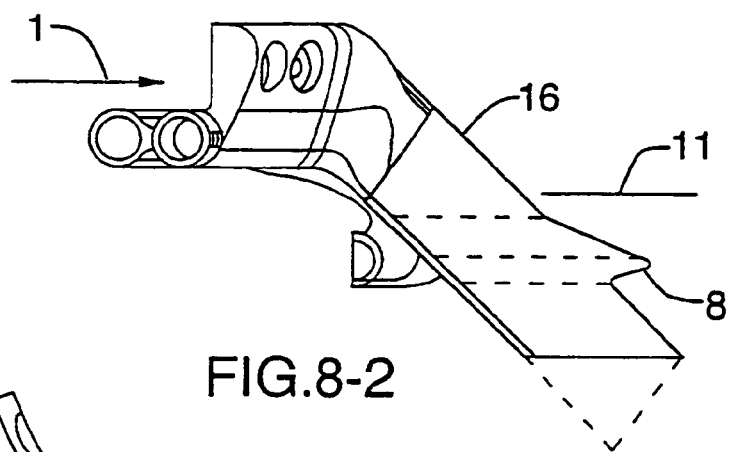
Figures 3, 8:
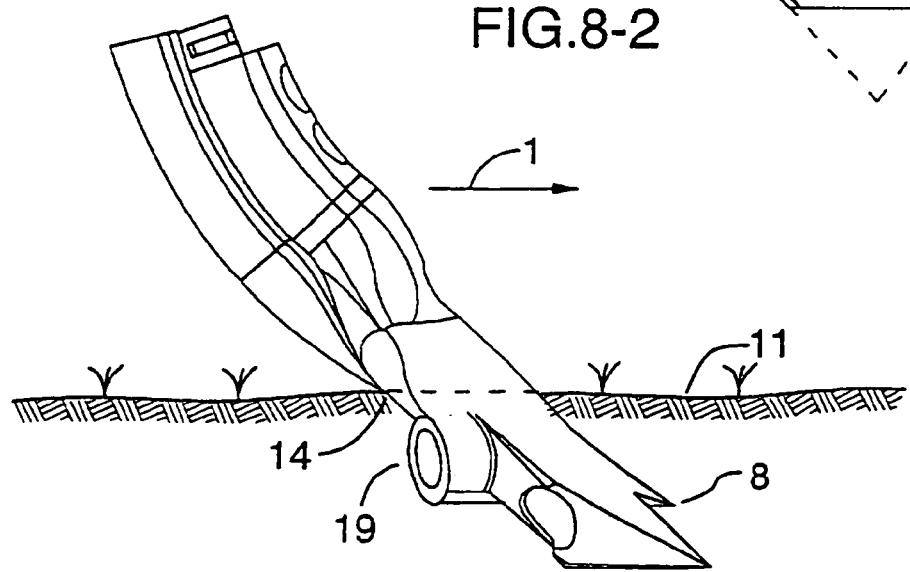

Another preferred embodiment is shown FIG. 8 in which FIG. 8-1 shows the embodiment in a front view, FIG. 8-2 in a plan view and FIG. 8-3 is a side elevation.

In FIG. 8 the embodiment is shown in conjunction with the knife and method shown in FIGS. 1–3 with a additional double shoot extension 8. Leading edge 16 of the lower portion 7 is extended further forward and downward as best depicted in FIG. 8-3. As seen in the front view of FIG. 8-1 this will provide a secondary furrow or ledge intermediate the surface of the soil 5 and the lower end 17. FIG. 8 show this embodiment as forming a v-shaped furrow particularly suited to the deposit of particulate material such as seed which would be retained in this groove. The extension 8 could have other shapes to form a ledge or other shape as required.

As extension 8 depends from lower surface 18b, extension 6 may be provided with a delivery conduit 19.

This double shoot method forms a seed or other material positioning shelf or secondary furrow within the angled furrow with a specific spacing from the lowermost extremity.

Figure 4:
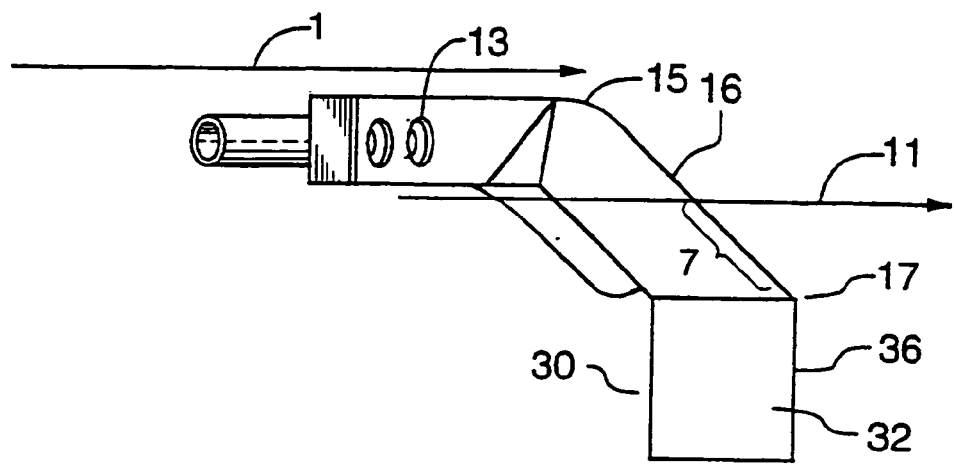
FIG. 4 is a plan view of a further embodiment according to the present invention.
Figure 5:
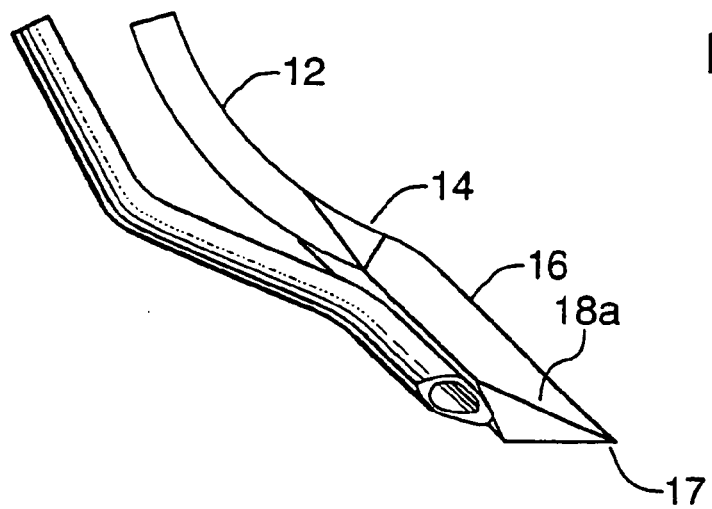
FIG. 5 is a side view of the embodiment of FIG. 4.
Figure 6:
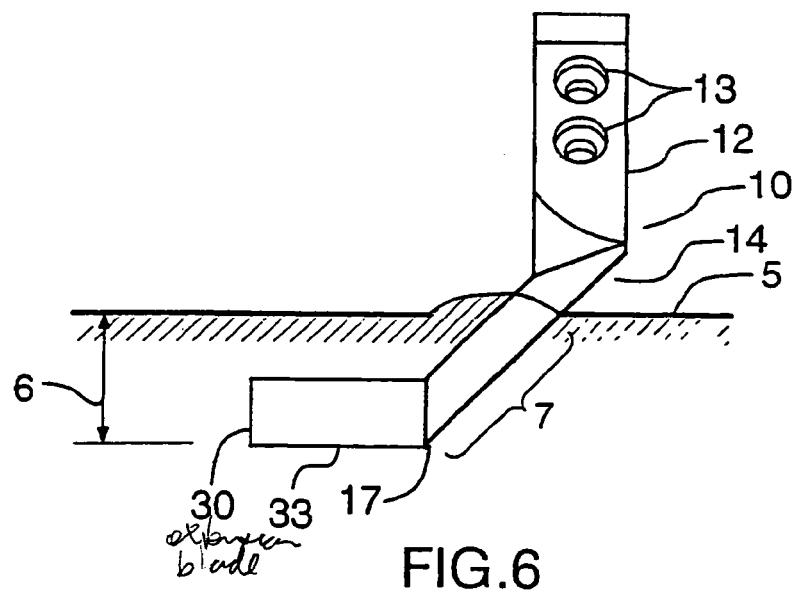
FIG. 6 is a front view of the embodiment of FIG. 4.

An alternate embodiment of the invention is shown in FIGS. 4–6. The knife 10 includes a blade 14 as described above. The knife 10 further includes an extension blade 30 that extends substantially horizontally from the blade 14 preferably at its lowermost end 17. The extension blade 30 has a leading cutting edge 36, which preferable forms a continuation of or $3^{rd}$ part of leading edge 16. Edge 36 is substantially horizontal and is preferably oriented transverse to the direction of travel. The cutting edge 36 is formed between an upper surface 32 angled upwardly and rearwardly and a lower surface 33 which is substantially horizontal. The lower blade surface 33 may preferably be angled to the rear, upwardly about 2 degrees, or notched, to reduce drag.

The extension blade 30 increases the operating width of the knife 10 as shown in FIG. 7. This extends the cultivating and/or planting area for greater seed bed utilization, or may be selected for greater spacing between seed planting while still effectively cutting existing plant roots to condition more of the width of soil. The extension blade 30 may be of varying width for different spacing considerations.

Outlets for seed, fertilizer and other additives may be spaced apart in or on the extension blade 30 to form distinct rows (not shown) and are preferably adjacent the rear surface thereof or may provide for broadcast across the width of extension 30.

Outlets may also be placed at the corner between the angled blade 14 and the extension 30 as at 24 on FIGS. 4 and 5, or higher on the angled blade 14, for vertical separation, such as for herbicide application nearer the soil surface.

As seen in FIG. 7, a plurality of knives 10 shown including extension 30 on an implement frame in outline may be arranged spaced in continuous or overlapping arrangement on the implement 2 so that the full width of soil is conditioned. The number and spacing will depend on the crop and planting conditions. Suitable placement of outlets along extension 30 would result in a generally scattered seed and fertilizer delivery in behind each knife 10. In this case the complete width of soil could be planted. Roots in the complete width of soil may also be cut by the blade extension without being dragged and fouling the knife 10.

The extension blade 30 may be positioned to travel under the path of the angled blade 14 of the adjacent knife 10.

Knives 10 are mounted to an implement or cultivator frame as in FIG. 7. A wing section of the frame is illustrated in outline form. Additional central and wing sections are not shown. The frame is carried on load bearing wheels (not shown) which support the frame in a raised position for travel and in operative position.

Adjustment of the height of the frame in a known fashion accurately controls furrow depth. Depths may typcially range from ½ inch to 4 inches or up to 6 inches. Alternatively, a ground following linkage may be used to attach each knife to the frame, with the depth being controlled by a wheel attached to each knife assembly.

In use the knifes 10 arranged in parallel fashion on an implement or overlapping arrangement on an angled draw bar are drawn by a tractor together with a seed carrier provided with reservoirs of seed and fertilizer material and a fluid delivery system operatively connected with the conduits 22 on the knives 10. The frame 2 is advanced with the leading cutting edges 16 and, optionally, 36 facing in the direction of travel 1. The deposit of material is controlled to the speed of advance at the tractor in a known fashion.

The knife 10 will not normally produce overlapping furrows without the blade extension 30 being present, or being long enough to result in an overlapped cut with adjacent rows as the placement would be too close. Weed control with herbicides is necessary in those circumstances.

As seeding occurs, fertilizer can be added simultaneously in controlled concentration, or at a desired depth or spacing from the seed. Fertilizer is more efficiently used without loss from runoff. Further fertilizer is placed to be available to the crop and not at the surface for weeds. A subsurface delivery of fertilizer is particularly effective if gaseous fertilizer, such as ammonia, is used. The knife provides a variety of options for placement with minimum adjustment and cost.

It may be desired to seed an area progressively in time for continuous harvest. Or with different additives, or with different crop. Since the process is a complete single pass operation, each seeding will include complete weeding and fertilizing more accurately than if separate steps are made which might leave areas untouched.

The invention may also be used as a light tilling tool for minimum soil disturbance without seeding or fertilizer outlets. This would cut weeds and provide minimum soil aeration. The knife advantageously does not turn the soil which would incorporate weed seeds from the surface into the soil to germinate.

Additional embodiments of the present invention will be apparent to persons of skill in the art.

The seeders are attached each to a respective mounting bar 128, which is suspended from the frame 129 of the implement, the suspension means including the usual break-back-spring mountings 130.

FIG. 10 is a front view of one of the angled-knife seeders 123. FIG. 10 shows the seeder being dragged forwards, i.e out of the paper, as indicated by the arrow 132. FIG. 11 is a lateral or side elevation, showing the seeder being drawn through the ground, and moving to the left as indicated by arrow 132. FIG. 11 includes an inset cross-section, taken on line X—X of FIG. 10; it is emphasized that line X—X is vertical, i.e the inset cross-section in FIG. 11 lies in a vertical plane.

As shown from the front view, FIG. 10, the seeder or knife 123 has an angled blade 134, which extends down into the ground to a depth, typically, of about 10 cm. The depth is determined by the needs of the type of seeds being planted; planting seeds deeper than 10 cm would be unusual, and 15 cm can be regarded as a maximum planting depth.

Figure 9:
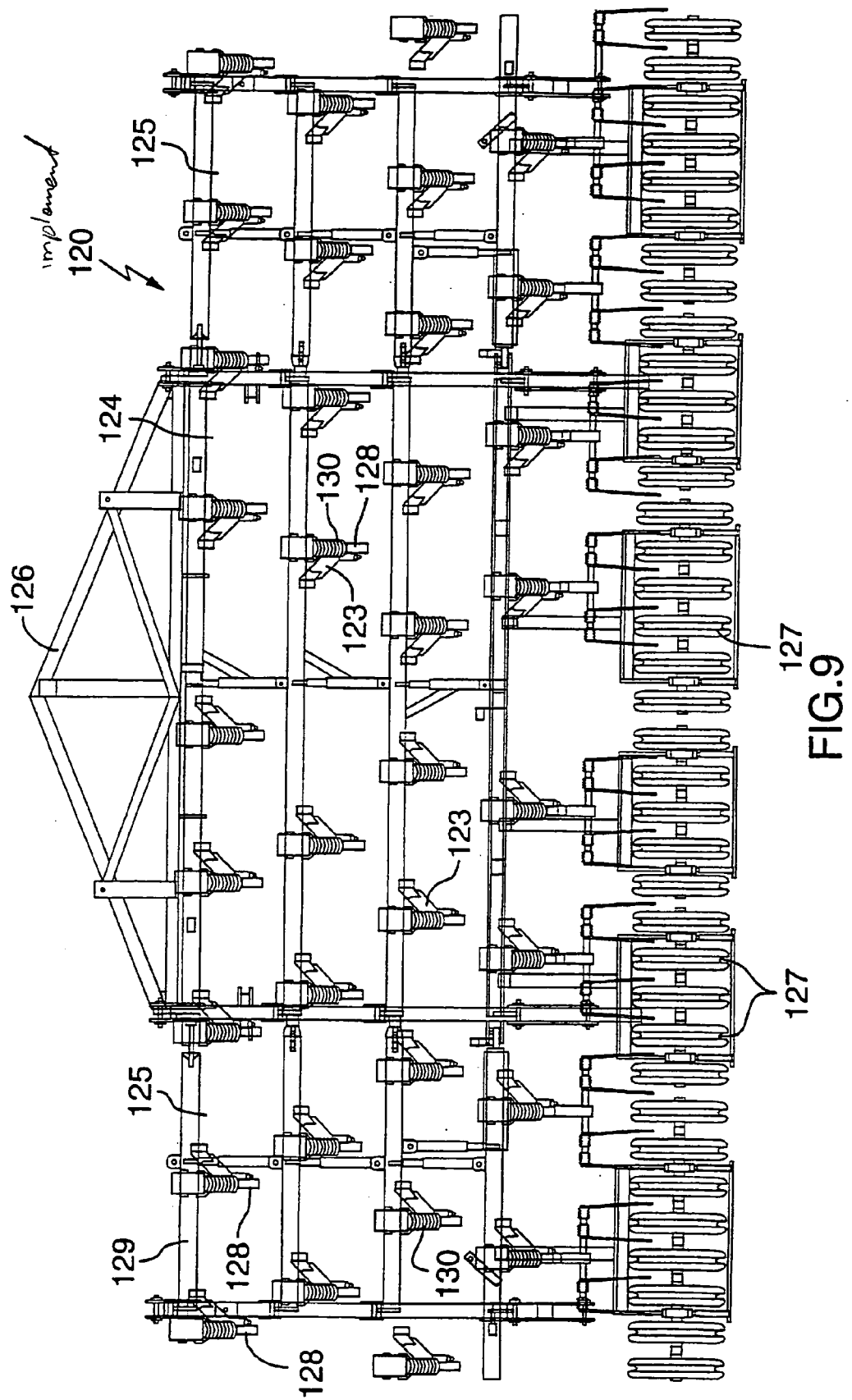
FIG. 9 is a plan view of an agricultural implement, for planting seeds, which incorporates the seeding knives of the invention.

The angled knife cuts an angled slit-opening in the ground, and the seeds are deposited therein. The seeds to be planted are supplied from a hopper on the implement, and are blown along a hose by means of a fan which forces an air flow in the hose. The hoses are of flexible plastic tubing, one for each seeder (the hoses are not shown in FIG. 9).

Each felxible hose is clipped to a respective conduit 135, which is built into the seeder 123. The conduit is structurally integrated into the back-side of the angled-knife-blade 134, and runs down the back-side 136 of the blade. The conduit ends in a discharge mouth 137, from which the seeds emerge, and fall down into the slit-opening. The discharge mouth 137 is near the bottom of the knife blade, whereby the seeds are deposited more or less at the bottom of the slit opening.

Figure 13:
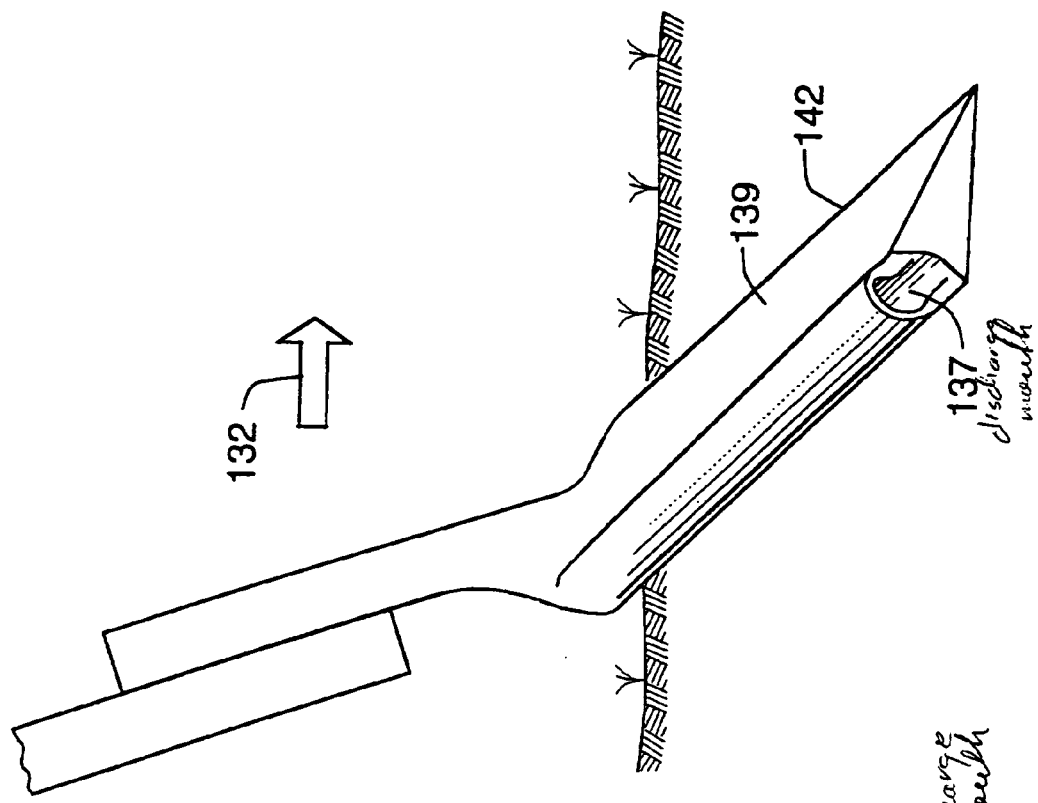
FIG. 13 is a right side elevation of the knife of FIG. 10.
Figure 12:
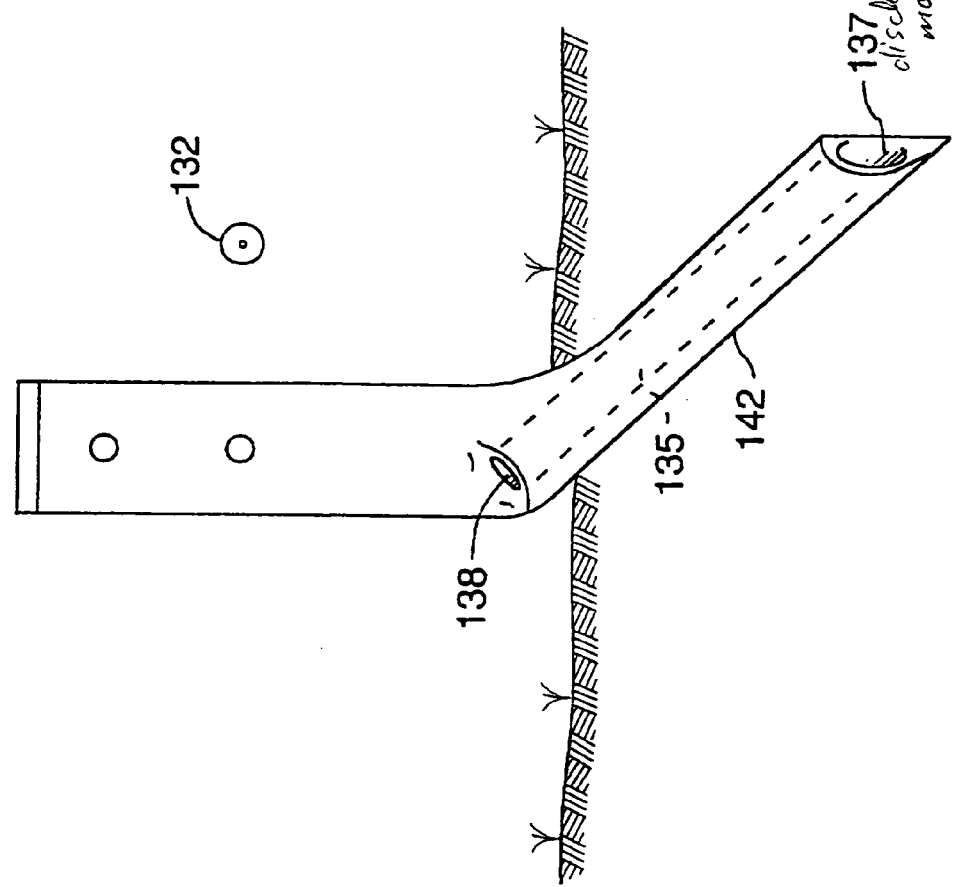
FIG. 12 is a rear elevation of knife of FIG. 10.

The conduit 135 is shown in the rear view of the seeder, FIG. 12, and in the opposite side-elevational view to FIG. 11, FIG. 13. The upper end of the conduit terminates at a port 138, into which the flexible hose can be secured.

The knife blade has an over-surface 139 and an under-surface 140. These surfaces are respective flat planes, which meet at a line, that line being the knife-edge 142. The blade is generally triangular in cross-section, in that the surfaces 139, 140 slope back from the knife edge, to a maximum thickness of the blade at the back-side 136 thereof. The conduit 135 is accommodated within the thickness of the back-side of the blade.

Figure 14:
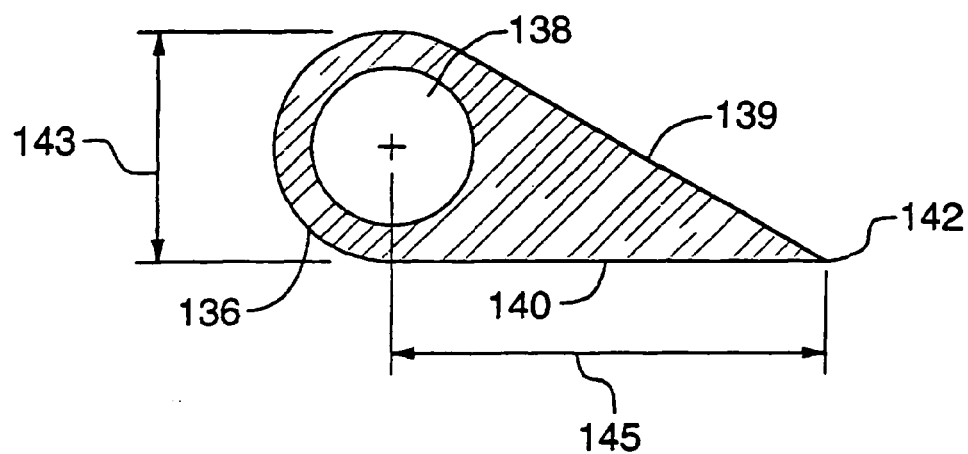
FIG. 14 is a cross-section of a blade of the knife of FIG. 10, the cross-section being taken in a plane at right angles to a knife-edge of the blade.

FIG. 14 is a cross-section of the blade 134, and shows the dimensions thereof. The FIG. 14 cross-section is taken in a plane at right angles to the knife-edge. The dimension 143 is the distance between the over-surface 139 and the under-surface 140 at the back-side of the blade, which in this case is 32 mm; and dimension 145 is the distance 11 from the knife-edge 142 to a mid-point of the conduit 135, which in this case is 70 mm. The conduit 135 has an internal diameter of 24 mm. The angle between the over-surface 139 and the under-surface, 140, in the cross-section at right-angles to the knife-edge, is called the wedge angle 146, which in this case is 25 degrees.

Not only is the angled blade 134 angled to the side, at a side-slope-angle 147, as shown in FIGS. 10 and 12, but the blade is also given a forward pitch angle 148, as shown in FIGS. 11 and 13. In this case, the side-slope angle 147 is 45 degrees, and the forward pitch angle is also 45 degrees.

The leading knife-edge 142 is positioned such that when the blade is viewed from in front, only the over-surface 139 can be seen. The under-surface 140 is invisible. That is to say, the knife edge is at the lowermost point of every vertical cross-section taken through the blade 134. Thus, the portion of soil that lies in the path of the blade lies in the path of the over-surface 139 of the blade. The over-surface has the wedge angle 146, and the soil is therefore driven upwards, by the wedge angle. The uplift travel of the soil is determined by the vertical height 149 of the over-surface 139, as presented to the oncoming soil, which in this case is about 8 cm.

Figure 15:
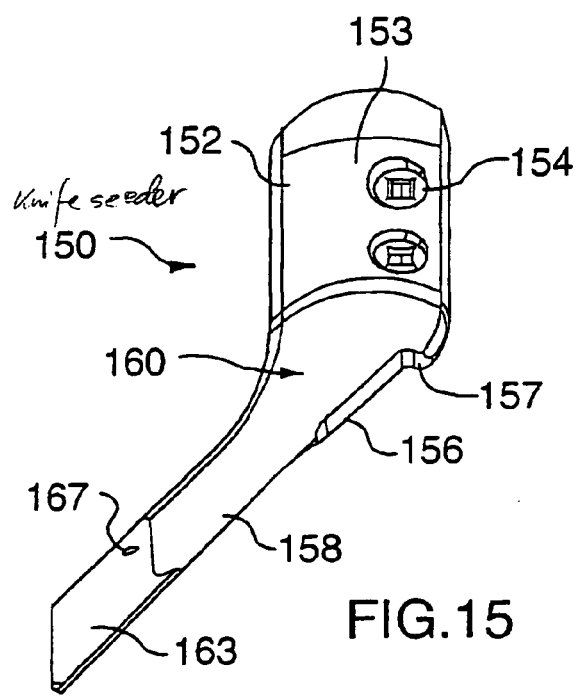
FIG. 15 is a front elevation corresponding to FIG. 10 of another angled seeding knife.

FIG. 15 is a front elevation of another design of angled-knife seeder 150. In this case, the above-ground portion of the seed conduit 152 is positioned to one side of the above-ground shank 153. This location of the conduit provides access for the nuts and bolts which are used at 154 to fix the seeder to the mounting bar 128. However, although access for the nuts and bolts is good, the extra width of the shank 153 means that the shank can be obtrusive, and can cause soil debris created by the passing of the angled blade to hang up; it might be regarded that the wide shank can act like a bulldozer blade.

A deflector surface 156 is provided, for deflecting soil debris away from the front face of the shank 153. The deflector surface is angled to deflect the debris downwards, and to the side. The nub 157 serves also to break the upward flow of the debris, and to keep the shank 153 clear.

It may be noted that, in FIG. 1, the triangular gusset-surface 159 also was disposed at an angle that included a downwards component, and so the gusset-surface 159 also served to deflect up-flowing debris downwards, and sideways, away from the shank 12 of the knife. Thus, the deflector-surface can be on the outside (FIG. 15) or the inside (FIG. 1) of the angle between the shank and the blade. Providing downward-facing deflector surfaces on both the inside and the outside also is possible, except that the designer should take care that the knife is not weakened thereby, at the transition 160 (FIG. 15), 162 (FIG. 1), between the shank and the angled blade.

Figure 16:
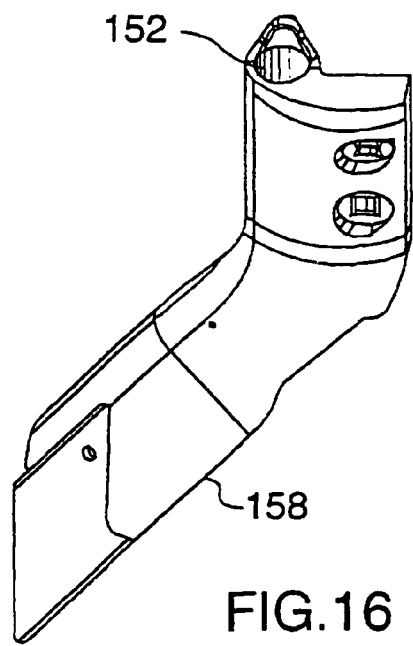
Figure 19:
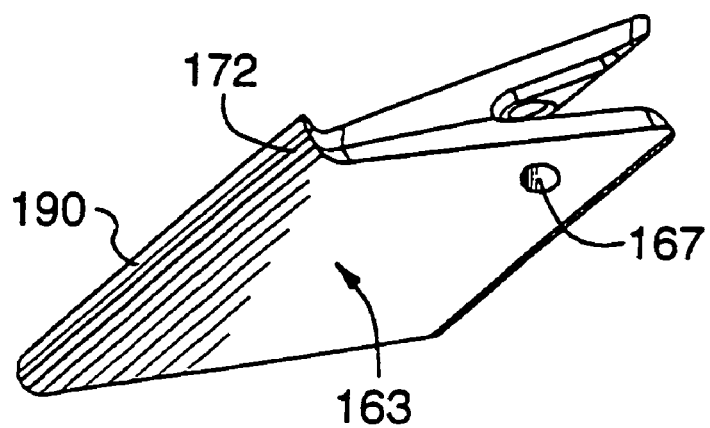
FIG. 19 is a pictorial elevation of a replaceable tip, of the knife of FIG. 15.
Figure 20:
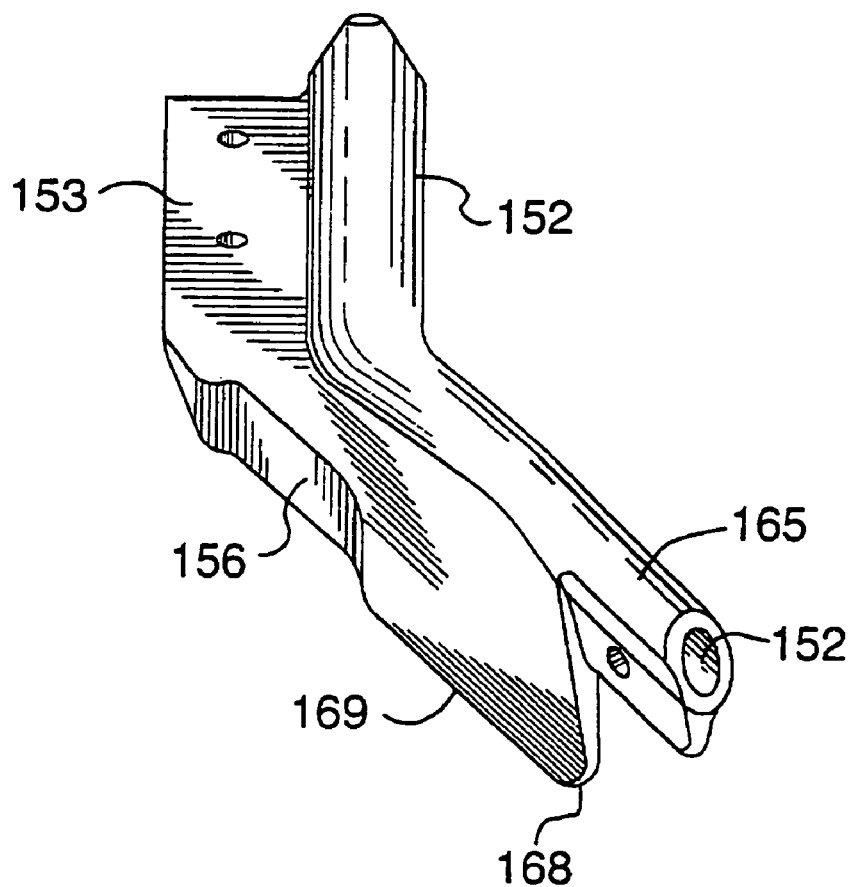
FIG. 20 is an elevation of the body of the knife of FIG. 15, and is shaded to show the configuration thereof.

FIGS. 16, 17, 18 are other views of the knife of FIG. 15. It will be noted that this knife includes a separable and replaceable tip 163. The tip is shown separately in FIG. 19. FIG. 20 is a shaded view of the back of the body 164 of the knife, and shows not only how the conduit in this design is moulded into the shape of the knife, but shows also a spline 165 on the body, which forms the mounting base for the replaceable tip 163. The tip is held to the spline 165 by means of a pin which engages the pin-receiving-hole 167. The spline is prism-shaped, having a triangular cross-section like that of the blade itself, but smaller, and the tip includes a socket that is complementary to the conduit. Once pinned in place, the tip is very securely constrained against all modes of movement relative to the body 164. The pin serves only to keep the tip from falling down the spline, but the force tending to make the tip move in that mode is minimal: all the heavy forces between the tip and the body are supported by the chunky spline 165.

The conduit 152 continues inside the spline 165. It is important that the seeds are deposited close to the bottom of the cut opening; with the conduit inside the spline, even though the bottom part of the knife comprises the tip, the conduit goes to the bottom of the opening. (It would be inefficient to cut the opening deeper than the planting depth of the seed, so the discharge mouth of the conduit should be as near the bottom of the knife as possible.) On the other hand, the prudent designer would seek to avoid calling for the manufacture of a (tubular) extension of the conduit in the tip casting. Putting the conduit in the spline puts the discharge mouth of the conduit more or less at the bottom of the trench, even though the knife has a replaceable tip.

It will be noted that the lower extremity 168 of the knife edge 169 on the body 164 is rounded convexly, whereas the upper extremity 172 of the knife edge 170 on the tip 163 includes a tag 173 which is rounded concavely. Thus, debris travelling up the knife 11 edge can readily pass smoothly over the transition between the two knife edges 169, 170. The designer should see to it that the knife edges do not contain interruptions, upon which soil-debris could be snagged. Forming the body 164 with a large convex radius is easy from the casting-manufacture standpoint; it is much easier to control the quality of a concavely-curved tag on the tip casting than on the body casting.

The knife edge 170 on the tip 163 can be blunter than the knife edge 169 on the body. The tip operates more deeply, where debris, even if imperfectly cut, tends to be brushed off the knife edge by the pressing passing soil. On the body, the knife edge itself has to do all the cutting of debris and vegetation, with little assistance from the passing soil, since, being shallower, the passing soil might more easily be deflected. It is noted that, if it happened, a hang-up of imperfectly cut material on the knife edge would be quite a serious problem, as it would quickly lead to disruption and disturbance of a large area of soil around the slit opening.

Conventionally, when seeding has been done with seeding knives (as opposed to discs, etc) the seeding knife has been held vertically. When the seeding knife is held at a side-slope-angle, as described herein, the manner in which the soil is opened for receiving the seeds is considerably changed.

When the knife is at a side-slope-angle of about 45 degrees to the horizontal, what happens is that a flap 174 of soil is lifted temporarily by the passing blade 134, and then the flap is lowered gently back after the seeder knife 123 has passed. As a result, the layers of the soil are preserved, during seeding. In other words, it is possible for a farmer to plant seeds without disturbing the stratification of the soil. It may be noted that the press wheels 127 serve to press the flap 174 back down, and assist in the maintainance of stratification: thus the function of the press wheel is more in harmony with the action of the angled blade, than in the case of a press wheel linked with, for example, a non-angled (vertical) seeding knife.

Maintenance of soil stratification is important in currently-favoured minimum-till farming regimes, because moisture in the layers a few centimeters down is not dissipated; weed seeds on the surface remain on the surface and do not germinate; and stalks and vegetation at the surface remain intact, providing cover and moisture retention. On the other hand, the angled knife, especially when a wing extension is provided below ground, cuts and severs the roots of any vegetation that might be present, whereby weeds and unwanted plant growth are destroyed at the time of planting the seeds. It may be noted that the weeds are destroyed simply by mechanical action. Using herbicide to destroy weeds is expensive and can be dangerous, and has to be done as a preliminary operation from seeding. Under suitable conditions, the underground "reach" of the angled knife can be enough to sever the roots of weeds and other growth not only around the seed openings, but over the whole area of ground between the openings.

The fact that the flap of soil is pushed upwards by the angled blade does not mean that the soil is compressed: if the soil were pushed downwards or sideways, it would become compressed and perhaps smeared, since there is no where for the deflected soil to go; but when the soil is urged upwards, the soil simply moves upwards. Of course, lifting deeper soil would involve lifting the weight of all the soil above, so lifting without compression only works down to shallow depths. Thus, it would not be possible to lift a flap of soil without compressing it if the soil were more than 10 or 15 cm deep. But it is recognised that seed planting is done predominantly at shallower depths than that; and it is recognised that the depths down to which an angled blade can cause the soil to simply lift without being compressed is a suitable depth to enable planting of nearly all types of seeds.

If the knife were nearly vertical, i.e it the knife were angled over at more than about 60 degrees to the horizontal, the lifting action that occurs with the angled knife would become negligible. With the 45-degree angle, most of the movement of the soil that occurs is a riding up of the soil over the front edge of the knife. At 60 degrees, the soil tends to be bulldozed, or chiselled, rather than slit or cut. Insofar as the soil is pushed to the side by the knife, the soil is compressed, and smeared, rather than gently lifted.

Of course, the knife must emerge from the ground surface, and the very shallow soil around the point of emergence inevitably is lifted too much, and tends to fly away. However, this effect is less disturbing than inserting a vertical chisel into the ground.

If the knife were more nearly horizontal, this fly-away lifting of the shallow soil might be too much. Besides, if the knife were nearly horizontal, although the knife would still lift the flap of soil, the knife blade would need to be too long in order to get down to the seed planting depth, which would mean that too much soil was being moved for a given planting depth, and which would be poor mechanically.

Tests have shown that the flap-lifting, stratification-maintaining, advantageous effects of the angled blade are largely lost if the blade is angled (i.e the side-slope-angle) more than about 55 degrees or less than about 35 degrees. 60 degrees and 30 degrees can be regarded as the practical limits. It has been found that the force required to draw the angled blade through the ground is at a minimum when the blade is at about 45 degrees. It may be noted that minimum draw force is an indication of minimum ground disturbance, which is what makes for minimum-till agriculture.

The leading knife-edge of the angled blade should be lowermost in the ground. That is to say, the soil approaching the blade should "see" only the over-surface of the blade. Thus, all the soil that is deflected is deflected upwards. If some of the soil were driven downwards, or horizontally sideways, it would be compressed or smeared, and seeding is most effective and efficient when the seeds are placed on and in soil that has not just been compressed.

The effective but gentle lifting as desired has been obtained with angled blades where the blade has been so presented that the over-surface has been about 7 cm high, measured in a vertical sense, from the leading knife edge to the back of the over-surface. (The thickness of the blade, measured in a plane at right angles to the leading edge, preferably is between 25 and 45 mm.) The angle between the over-surface of the blade and the under-surface, called the wedge angle, is a key factor in determining the lift of the blade, and good results have been obtained when the wedge angle lies between 20 and 30 degrees.

Preferably, the over-surface should be a single flat plane over its whole area, but it is recognised that it is the front of the over-surface of the blade that is key to the performance, i.e the front 4 cm of the over-surface contiguous with the knife edge.

Preferably, the blade is generally triangular as to its cross-sectional shape, the three sides of the triangle being the over-surface, the under-surface, and the back-side of the blade. (The back-side is not, as shown, a flat plane.) It is recognised that triangular is a good shape, in that it leads to a suitable angle for the over-surface of the blade, in order for the over-surface to deflect soil dynamically; also, the bottom face can be easily set to not touch the soil passing-by underneath the blade; also, the thick back-side has to be thick to accommodate the conduit. In short, the triangular shape is a highly efficient shape for performing the soil-moving operations required for seeding, for accommodating the seed conduit, and (not least) is a good shape for providing mechanical strength and rigidity in just the right amounts for the task.

The designer should see to it that the knife is reasonably short, in the travel direction. Length would just lead to extra drag, and perhaps smearing of the soil. The aim should be to combine efficient use of surfaces and angles to give the smooth lift-then-fall-back movement of the soil, without disturbing the soil, and while maintaining stratification. The designer should see to it that the surfaces are angled enough, and are long enough for that, and of course the knife has to be strong and rigid enough to be struck occasionally by stones etc without being damaged. It is recognised that the angled blade as described herein is a design that handles these conflicting requirements very advantageously.

The conduit preferably should be in the size range of 15 to 25 mm diameter, for proper seed conveyance. It is recognised that such a size of conduit is well-suited to being located behind the triangular angled blade, as described. The blade surfaces, i.e the over-surface and the under-surface, slope towards the conduit as two simple flat planes, straight from the knife edge.

As mentioned, the functions of the blade require that the blade be wide enough for its surfaces to be so angled as to be effective; and the blade must also be strong enough; beyond that, the blade should preferably be short. Good results have been obtained when the blade is about 7 cm, or at least between 5 cm and 10 cm, in width, from the knife-edge to a mid-point inside the conduit.

The blade should have forward pitch to ensure the soil debris can clear, by riding upwards along the knife edge, and out of the soil. It will happen sometimes that some materials are not cut, or are not cut immediately, by the knife edge, and will be piled up ahead of the knife edge, thereby blunting the knife edge. The angled knife should have forward pitch to counteract this. Of course, conventional vertical seeding knives have had forward pitch.

Preferably, the seed conduit should be integral with the knife unit. If separate, the conduit has to be attached to the knife unit. The conduit should not get in the way, not least above ground, where the conduit can contribute to snagging of soil debris. Therefore, the conduit should lie in line behind the knife. Whilst this is clearly achievable below ground, above ground putting the conduit in line with the knife structure is not so good, because the shank of the knife is attached to the mounting bar by bolts passing though from front to back, and putting the conduit behind the shank would deny access to the bolts/nuts.

The designer also wants the point of attachment of the flexible seed hose to be high, out of harm's way, and also wants to provide room for a clip for attaching the hose into the conduit. The designer either can put the conduit on a stalk that protrudes out behind the shank (which suits fabricated construction (FIG. 2)), or can put the conduit to one side of the shank (which suits casting (FIG. 16)). Or, the conduit may be finished lower down, below where the shank is bolted to the mounting bar (FIG. 11), although now the flexible hose might be vulnerably close to the ground.

Putting the conduit to one side of the shank (FIG. 16) gives access to the fixing bolts, but now the front face of shank is thereby widened, so it is even more important to take measures against snagging of the above-ground soil debris on the shank.

One of the benefits of the angled blade configuration lies in the ability to deposit two types of items simultaneously, e.g seeds and fertiliser, which preferably should be kept spaced apart, upon planting. Simultaneous deposition of both seeds and fertiliser (FIG. 8) is simplified by the fact that the knife is at an angle, while ensuring same are kept spaced apart. If the knife were vertical, both items would fall to the bottom of the trench, and it would be difficult to keep the items apart. On vertical knife seeders, it is conventional to provide side ledges, for fertiliser; however, the protrusions on the vertical knives that produce such side ledges have also compressed the soil.

Generally, the farmer wishes to plant as many rows of seeds as possible in a single pass of the seeder implement. In one of the machines described herein, thirty-five seeders are provided on a single implement. The smallest number that might practically be contemplated, would be about eighteen seeders per implement. The large number of seeders is appropriate for single-pass seeding operations at shallow depth, in that a tractor can easily provide the force necessary to draw a large number of shallow seeders through the ground. This may be contrasted with the conventional usage of angled cutters to break up hard-pan sub-soil, i.e caked clay and soil some 50 cm or more below ground. Sometimes, these deep angled-cutters have been used to prepare ground for seeding, but in that case the seeding has been done separately, as a follow-up seeding operation, using conventional seed drills. (Breaking up hard-pan also can be done for other purposes, e.g to improve drainage.) The conventional large, deep, hard-pan angled-cutters were angled simply in order to cover more ground. They were constructed so as to cause maximum disturbance to the soil, at a large depth; they required large forces to draw them through the ground, so that only a small number, say four or five, could be pulled by a tractor. The use of an angled blade as described herein to lift shallow flaps of soil with minimum disruption, and to lower the soil flap back down without disturbing stratification, makes a clear contrast with the use of deep angled cutters to break up hard-pan. It is emphasized that the gentle, minimum-till, operations described can take place only at shallow depths.

In the above aspects, the invention is defined by reference to an implement, in which the angled blades are mounted for operation. In another aspect, the invention can be defined with respect only to the knife unit itself, independently of the implement. In this case, the definition makes use of the shank of the knife, and of the axis of the shank. When the shank is provided with two bolts, one above the other, for attachment to the mounting bar, the shank axis (in a frontal view of the shank) is the line that runs through the bolts. However, even if the shank is mounted by means other than two bolts vertically in-line, the shank still has an axis, which can be determined by the geometry of the shank in a particular case. The major features of the invention, that the blade lies at an angle to the shank in front view, and the shallow depth of the blade, are present in this definition.

As mentioned above, sometimes the conventional vertical knife seeders have included, as an accessory, a means for providing a side ledge to the vertical trench. As mentioned, grains of fertiliser are deposited on or in this side ledge, whereby the fertiliser can be kept spaced apart from the seeds. The fertiliser rests on the ledge, while the seeds fall down to the bottom of the vertical trench.

An example of such a vertical-knife-with-side-ledge structure is depicted in Canadian patent publication CA-2,099,555 (Henry, 1995). Henry's structure includes first a conventional vertical knife-blade 25, for cutting a vertical slit in the ground, with the associated delivery pipe for depositing seeds at the bottom of the vertical slit. Henry also shows a ledge-cutting accessory 28. The accessory 28 is fixed to the back of the vertical knife-blade 25. Thus, in the design as depicted in FIGS. 5a,5b of Henry, two injectors are shown: one for injecting seeds, and the other for injecting fertiliser.

Regarding Henry's vertical knife-blade cutter/seed injector: when viewed from the side (FIG. 5a), Henry's knife blade 25 is angled, such that the bottom extremity of the knife-blade leads the rest of the knife-blade as the knife-blade travels through the ground. It is conventional, and very common, for vertical seeding-trench knife-blades to be angled forwards, i.e bottom-edge leading. In the front view (FIG. 5b), Henry's knife-blade 25 is not angled at all.

Regarding Henry's side-ledge cutter/fertiliser-injector: when viewed from the side (FIG. 5a), Henry's ledge-cutter 28 is so angled as to be "bottom-edge trailing". That is to say, the bottom extremity of the ledge-cutter lags, or trails, as the ledge-cutter travels through the ground. In the front view (FIG. 5b), Henry's ledge-cutter 28 makes an angle to the horizontal of about 45 degrees.

Neither of the blades or cutters of Henry will achieve the "gentle up-and-over" effect, which is the aim of the present invention. This is because neither of the blades or cutters of Henry has an over-surface and an under-surface, which meet at a line, where the line defines the leading knife edge of the blade, and where the knife edge, thus defined, has a side-slope angle of between 30 degrees and 60 degrees.

What is claimed is:

1. An agricultural implement, which is arranged for introducing materials into the ground, wherein:
   the implement includes a knife having an angled blade;
   the implement includes a drawing means, for drawing the angled blade through the ground in a forwards direction;
   the angled blade is effective, when drawn through the ground, to create an angled silt-opening in the ground;
   the implement includes a conduit for conducting the materials to the angled blade;
   the conduit is secured to the angled blade, and is so positioned thereon that, during operation, a discharge mouth of the conduit is located in the ground at a depth below the ground surface, and is so located in relation to the angled blade as to deposit the materials directly behind the angled blade, in the slit-opening created by the angled blade, as the knife is drawn through the ground;
   the angled blade is formed with an over-surface and an under-surface, which intersect at a line, and the line defines a knife-edge of the blade;
   the implement includes a knife-mounting means;
   the knife-mounting means is effective to mount the angled blade at such an orientation and disposition in relation to the ground, during operation of the implement, that:
   (a) when viewed from the forwards direction, the knife-edge makes an angle to the horizontal, termed the side-sloped angle, of between 30 and 60 degrees; and
   (b) the angled blade extends down into the ground to a blade-depth of no more than about 15 cm, measured vertically down from the ground surface wherein the blade is so mounted that, at a vertical cross-section of the blade, taken below the ground surface, substantially no point in or on the blade at that vertical cross-section is vertically lower in the ground than the knife-edge at that vertical cross-section.

2. As is claim 1, wherein the blade-depth is no more than about 10 cm.

3. As is claim 1, wherein the angled blade includes a below-ground portion, which lies wholly below ground, during operation, and the line defining the knife-edge is a straight line, when viewed in front elevation, over substantially the whole of the below-ground portion of the blade.

4. As in claim 1, wherein the angled blade includes a below-ground portion which lies wholly below ground during operation, and the line defining the knife-edge is a straight line, when viewed at right angles to the over-surface, over substantially the whole of the below-ground portion of the blade.

5. As in claim 1, wherein the side-sloping-angle is about 45 degrees.

6. As in claim 5 wherein the side-slope angle of the blade is constant over substantially the whole of the below-ground portion of the blade.

7. As in claim 1, wherein the over-surface of the blade is so angled that, when the blade is drawn through the ground, ground-soil in the path of the over-surface is lifted upwards thereby.

8. As in claim 1, wherein:
the over-surface of the blade includes an upper-edge surface, which is a portion of the over-surface that:
a) is contiguous with the knife-edge;
b) lies between the knife-edge and a line drawn on the over-surface parallel to the knife-edge and 4 cm back from the knife-edge; and
c) lies between the bottom extremity of the knife-edge and the ground surface;
the upper-edge-surface is a unitary flat plane;
the knife-mounting means is effective to mount the angled blade at such an orientation and disposition of the knife in relation to the ground that a normal to the upper-edge-surface points upwards relative to the horizontal.

9. As in claim 1, when viewed in cross-section of the blade taken in a plane at right angles to the knife-edge, the upper-edge-surface of the blade lies at an angle, termed the wedge-angle of the upper-edge surface of the blade, of between 14 and 45 degrees.

10. As in claim 9, wherein the wedge-angle of the upper-edge surface of the blade is about 25 degrees.

11. As in claim 9, wherein the wedge-angle of the upper-edge-surface of the blade is substantially constant over a substantial area of the blade, being an area of the blade below the ground surface.

12. As in claim 1, wherein, when viewed from the forwards direction, the over-surface of the blade occupies a height, above the knife-edge, of between 6 cm ad 10 cm, measured vertically.

13. As in claim 1, wherein when viewed from the forward direction, the over-surface of the blade occupies a height, above the knife-edge, of between 2.5 cm and 4.5 cm, measured at right angles to the knife-edge.

14. As in claim 1, wherein:
the under-surface of the blade includes a lower-edge surface, which is that portion of the under-surface that
a) is contiguous with the knife-edge;
b) lies between the knife-edge and a line drawn on the under-surface parallel to the knife-edge and 4 cm back from the knife-edge; and
c) lies between the bottom extremity of the knife-edge and the ground surface; the knife-mounting means is effective to mount the angled blade at such an orientation and disposition of the knife in relation to the ground that normals drawn from substantially all points on the lower-edge-surface points downwards.

15. As in claim 14, wherein the under-surface is so disposed that, when the knife is viewed in side elevation, during operation, a normal to the under-surface is vertical or points slightly backwards from vertical.

16. As in claim 1, wherein the blade, as viewed in cross-section at the right angles of the knife-edge, is generally triangular in shape, the tree sides of the triangle being the laid over-surface, the said under-surface, and a back-side of the blade.

17. As in claim 16, wherein the distance between the over-surface and the under-surface at or adjacent to the back side of the blade is between 1.5 and 4.5.

18. As in claim 16, wherein the triangle is the same, as to size, shape, and orientation, at all below-ground cross-section at the right angles to the knife-edge.

19. As in claim 1, wherein, over at least the portion of the blade that lies below ground during operation, the conduit is structurally integrated into, or supported upon, a back-side of the blade.

20. As in claim 19, wherein the blade is so structured that substantially no pan of the structure of the blade extends behind the conduit.

21. As in claim 19, wherein the over-surface and under-surface of the blade are flat planes extending from the knife-edge right back to the conduit.

22. As in claim 19, wherein the conduit has walls, and the conduit has a diametral dimension, inside the walls thereof, of between 10 mm and 25 mm.

23. As in claim 19, wherein the back-side of the blade, and the walls of the conduit, lie parallel to the knife-edge, when viewed in front elevation.

24. As in claim 19, wherein the back-side, and when walls of the conduit, lie parallel to the knife-edge, when viewed at right angles to the over-surface.

25. As in claim 19, wherein, in a cross-section of the blade taken in a plane at right angles to the knife-edge, the blade measures between 5 cm and 10 cm in width, from the knife-edge to a mid-point inside the conduit.

26. As in claim 1, wherein the knife-mounting means is effective to mount the angled blade at such an orientation and disposition in relation to the ground, during operation of the implement, that:
when viewed in lateral or side elevation, during operation, the knife-edge makes an angle to the horizontal, termed the forward-pitch-angle, of between 30 and 60 degrees;
the blade slopes forward in that view, whereby deeper portions of the knife-edge in the ground lie ahead of more shallow portions of the knife-edge.

27. As in claim 26, wherein the forward-pitch-angle is 45 degrees.

28. As in claim 1, wherein the portion of the knife-edge below ground is smooth and uninterrupted, in the sense that there is substantially nothing on the knife-edge that would snag soil and debris passing upwards along the knife-edge, during operation.

29. As in claim 1, wherein:
the knife includes an in-ground blade portion, an above-ground shank portion, and an at-ground-surface transition portion;
the general shape and disposition of the knife is such that, during operation thereof, soil and debris traveling up the knife-edge towards, and out of, the ground surface is deflected aside from the shank portion.

30. As in claim 29, wherein:
the at-ground-surface transition portion of he knife is formed with a deflector-surface;
the deflector-surface is so orientated upon the knife as to be visible from in front, in a horizontal front elevation, when the knife is operating in the ground;
when viewed in a lateral or side elevation of the knife during operation, a normal to the deflector-surface points backwards and downwards;
the above-ground shank portion includes a front surface and a rear surface, and left and right side surfaces, and the disposition of the knife is such that, during operation, soil debris traveling up the knife-edge towards the ground surface encounters the deflector-surface upon reaching the ground surface, and is deflected aside by same, and is thereby deflected clear of the front surface of the above-ground shank portion of the knife, and is deflected by same downwards and is thereby at least somewhat inhibited from flying into the air.

31. As in claim 30, wherein the knife-edge and the deflector-surface are contiguous, and he knife is so contiguous that the knife-edge blends smoothly into the deflector-surface without snags or interruptions.

32. As in claim 30, wherein:
the shank portion and the blade portion lie relatively at an angle, at or near the at-ground-surface transition portion, and the deflector-surface lies on the outside of the angle;
on the inside of the angle, the knife is smooth and has a configuration that resists snagging of soil debris.

33. As in claim 30, wherein The deflector-surface extends no more than about 2 cm below the ground surface.

34. As in claim 1, wherein:
a frame of the implement includes a seeding-knife-mounting bar;
the knife is formed with an above-ground shank-portion, and he knife mounting means includes an operable attachment means whereby the knife can be detachably attached to the seeding-knife-mounting bar;
and the conduit is so positioned in relation to the shank-portion as to allow access for operation of the attachment means.

35. As in claim 34, wherein:
the shank portion includes a front surface and a rear surface, and left and right side surfaces;
in front view of lie knife, the conduit lies in line with, and behind, the above-ground shank-portion;
and the conduit is spaced from the rear surface by a distance that is enough to permit access for operation of eh attachment means.

36. As in clam 34, wherein:
the shank portion includes a front surface and a rear surface, and the left and right side surfaces;
and the conduit is located at one of the left and right side surfaces of the above-ground shank-portion.

37. As in claim 1, wherein the implement includes a seeding hose, of flexible material, and the conduit includes a port, for attachment thereto of the flexible seeding hose.

38. As in claim 1, wherein:
the knife includes a wing-extension;
the wing-extension is formed with an over-surface and an under-surface, which intersect at a line, and the line defines a wing-knife-edge of the wing-extension;
the knife includes a wing-mounting-means, which is effective to so mount the wing-extension in relation to the angled blade that:
(a) the knife-edge of the blade and the wing-knife-edge meet contiguously, at a point at the bottom of the knife-edge of the blade;
(b) the wing-knife-edge extends substantially horizontally from the said point;
(c) and the blade is so mounted that, at any vertical cross-section of the wing-extension, substantially no point in or on the wing-extension at that vertical cross-section is vertically lower in the ground than the wing-knife-edge at that vertical cross-section.

39. As in claim 38, wherein the overall vertical thickness of the wing extension is no more than 2 cm.

40. As in claim 38, wherein the wing-knife-edge forms a horizontal straight line, which in plan view lies at right angles to the forwards direction.

41. As in claim 1, wherein:
the angled blade includes a promontory, which is effective, when the blade is drawn through the ground, to cut a side ledge in the slit-opening;
the implement includes a second conduit for conducting a second material to the angled blade;
the second conduit is secured to the angled blade, and is so positioned thereon that, during operation, a discharge mouth of the second conduit is located in the ground at a depth below the ground surface, and is so located in the ground at a depth below the ground surface, and is so located in relation to the angled blade as to deposit the second material directly behind the promontory, and onto the side ledge, as the knife is drawn through the ground.

42. As in claim 41, wherein:
the slit opening as cut by the angled knife blade, and the disposition of the discharge mouth of the conduit, are such that the materials discharged from the conduit fall to the bottom of the slit opening;
the side ledge as cut by the promontory, and the disposition of the second conduit, are such that the second materials discharged from the second conduit fall onto the side ledge.

43. As in claim 42, wherein the materials are seeds, and the second material is fertilizer.

44. As in claim 43, wherein the second materials are deposited on soil in the side ledge that has substantially not been compressed by the passage of the promontory to the angled knife.

45. As in claim 1, wherein the materials are deposited on soil in the slit opening that has substantially not been compressed by the passage of the angled knife.

46. As in claim 1, wherein the implement includes a means for forcing air to flow through the conduit, whereby particulate materials in the conduit are urged along the conduit, and out of the discharge mouth, by the flow of air.

47. As in claim 1, wherein the implement includes an implement-frame, from which the angled blade in suspended, and the drawing means includes a bitching means whereby the implement-frame is hitched to a tractor.

48. As in claim 1, wherein a large number of te said knives are mounted on the implement, each angled blade being so mounted as to be oriented and disposed each in the manner as defined in claim 1, the large number being eighteen or more.

49. As in claim 48, wherein, when viewed from the forwards direction, a substantial proportion of the large number of knives are angled to the left, and the remainder thereof are angled to the right.

50. As in claim 48, wherein the implement includes press-wheels, one for each angled knife, the press wheels being effective to roll over the soil lifted by the action of the angled knives.

51. As in claim 1, wherein the implement includes a hopper, for storage of the materials to be introduced into the ground, and the conduit is arranged to conduct the materials from the hopper to the angled blade.

52. An agricultural knife assembly, which is so structured as to be suitable for inserting granular materials into the ground, wherein:
   the knife assembly is structurally suitable for the operations of creating a slit-opening in the ground and of inserting the materials into the slit-opening;
   the knife assembly comprises a body-member and a replaceable tip-member;
   the assembly comprises a knife having an angled blade assembly;
   the body-member includes a body-over-surface and a body-under-surface, which intersects at a line, and the line defines a body-knife-edge,
   the tip-member includes a tip-over-surface and a tip-under-surface, which intersects at a line, and the line defines a tip-knife-edge;
   the shapes of the body-member and the tip-member, and the arrangement of the assembly, are such that:
   a) the body-knife-edge terminates at a lower extremity thereof, and the tip-knife-edge terminates at an upper extremity thereof;
   b) the lower extremity of the body-knife-edge is contiguous with, and co-linear with, the upper extremity of the tip-knife-edge;
   c) the tip-over-surface is a continuation of the plane of the body-over-surface, and
   the tip-under-surface is a continuation of the plane of the body-under-surface;
   the body-member, as viewed in cross-section at right angles to the body-knife-edge, is generally triangular in form, the three sides of the triangle being the said body-over-surface, the said body-under-surface, and a body-back-side of the body-member;
   the tip-member, as viewed in cross-section at right angles to the tip-knife-edge, is generally triangular in form, the three sides of the triangle being the said tip-over-surface, the said tip-under-surface, and a tip-back-side of the tip-member;
   a first one of the members includes a spline, and the other includes a complementary socket;
   the spline and socket are so complementarily shaped that the tip-member can be engaged on, and disengaged from, the body-member, and, when the tip-member is fully engaged on the body-member, the tip-member is thereby held constrained against all modes of rotational movement of the tip-member relative to the body-member;
   the assembly includes an operable release means;
   the release means is effective to hold the tip-member fully engaged on the body-member, and, when operated, is effective to release the tip-member from the body-member.

53. As in claim 52, wherein:
   the spline is a prism having the same general triangular shape as the first-member, but is of a smaller size;
   the disposition of the spline in the first member is such that a spline-back-side of the triangular form of the spline lies in line with the back-side of the first member;
   the socket in he second member is complementary to the triangular shape of the spline, and comprises an open-backed hollow chamber of the second member;
   the socket is positioned centrally within the back side of the second member, the structure of the second member being such that the socket is defined by, and lies between, upper and lower checks of the second member;
   the disposition of he members is such that the upper and lower checks of the second member overlie the spline, respectively above and below, when the tip-member is filly engaged in the body-member.

54. As in clam 52, in association with all agricultural implement, wherein the implement includes a conduit for conducting seeds to the knife assembly;
   the conduit is secured to the body-member, and is located at the body-back-side thereof;
   the conduit continues down from the body-back-side, and extends down the spline-back-side;
   a discharge mouth of the conduit is located at a lowermost extremity of the spline-back-side.

* * * * *